(12) United States Patent
Mehnert et al.

(10) Patent No.: US 8,111,065 B2
(45) Date of Patent: Feb. 7, 2012

(54) SENSOR UNIT FOR A ROTARY ENCODER AND A ROTARY ENCODER EQUIPPED WITH SUCH A SENSOR UNIT

(76) Inventors: Walter Mehnert, Ottobrunn (DE); Thomas Theil, Feldafing (DE)

( * ) Notice: Subject to any disclaimer, the term of this patent is extended or adjusted under 35 U.S.C. 154(b) by 371 days.

(21) Appl. No.: 12/550,104

(22) Filed: Aug. 28, 2009

(65) Prior Publication Data
US 2010/0052663 A1 Mar. 4, 2010

(30) Foreign Application Priority Data

| Aug. 30, 2008 | (DE) | 10 2008 045 173 |
| Oct. 8, 2008 | (DE) | 10 2008 050 823 |
| Oct. 13, 2008 | (DE) | 10 2008 051 479 |

(51) Int. Cl.
*G01B 7/30* (2006.01)
(52) U.S. Cl. .................... 324/207.25; 324/207.15
(58) Field of Classification Search .......... 324/207.15, 324/207.25
See application file for complete search history.

(56) References Cited

U.S. PATENT DOCUMENTS 4,375,047 A * 2/1983 Nelson et al. ............ 318/48
5,565,769 A * 10/1996 Mehnert et al. ........... 324/207.15
* cited by examiner

*Primary Examiner* — Reena Aurora
(74) *Attorney, Agent, or Firm* — Sughrue Mion, PLLC

(57) ABSTRACT

There is described a sensor unit (3) for a rotary encoder which serves for detecting the rotary movements of a drive shaft (1) in both directions and which has a single-stage transmission with an input gear (15) which is arranged concentrically with respect to and is non-rotatably connected to the drive shaft (1). The sensor unit includes an absolute segment counter which serves for counting the angle segments through which the drive shaft passes within each 360° rotation and has the following components: a magnetic segment counter exciter arrangement non-rotatably mounted on the second gear (16) of the transmission, that engages into the input gear, a stationary segment counter sensor arrangement which includes a Wiegand or pulse wire (28) with wound-on induction coil (29) and which delivers electrical pulses whenever the magnetic segment counter exciter arrangement passes through predetermined angular positions, and an electronic circuit (32) which counts said electrical pulses, stores the respectively acquired count value and calculates therefrom the instantaneous angular position of the drive shaft having regard to the transmission ratio of the transmission.

20 Claims, 3 Drawing Sheets

Figure 1:
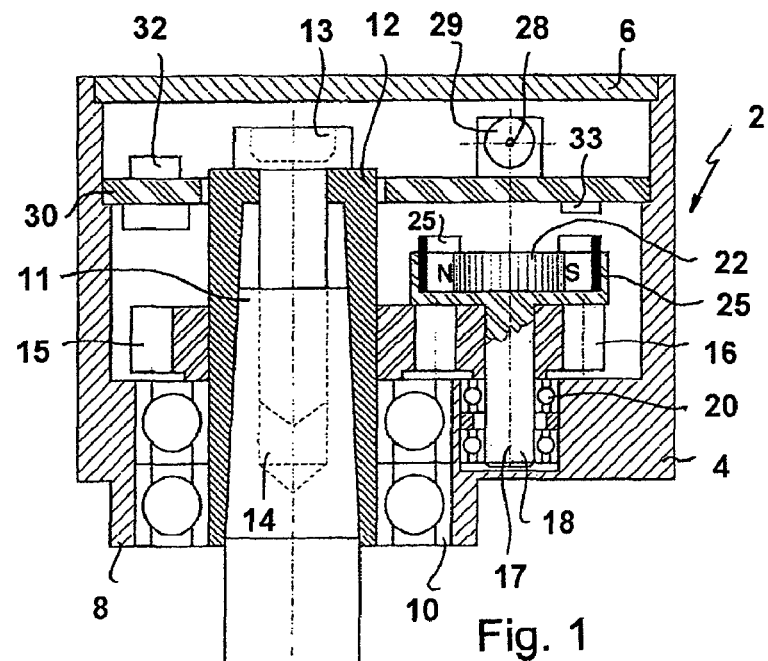

SENSOR UNIT FOR A ROTARY ENCODER AND A ROTARY ENCODER EQUIPPED WITH SUCH A SENSOR UNIT

The invention concerns a sensor unit for a rotary encoder of the kind set forth in the classifying portion of claim 1 and a rotary encoder equipped with such a sensor unit.

In the present description the shaft, the numbers of revolutions of which are ultimately to be detected and the angular positions of which are to be measured is referred to as a "drive shaft".

A revolution counter in which, whenever the drive shaft passes through a predetermined angular position, a counting signal is generated, preferably with identification of the direction of rotation, and fed with the correct sign to a counter (upward counting in one direction of rotation and downward counting in the opposite direction of rotation), is then referred to as "absolute" when it is capable of delivering the correct count value after a complete interruption in its power supply, in particular even after separation of a battery which is possibly provided, upon the restoration of the energy supply, even if the drive shaft has continued to rotate in the period of the interruption.

For that purpose it is known from EP 0 658 745 A2 to branch off a part of the mechanical kinetic energy of the rotating drive shaft and to accumulate it in a magnetic intermediate storage means until the above-mentioned predetermined angular position is reached. At that position the stored energy is then liberated abruptly so that an electrical pulse is inductively generated therefrom, which pulse can be used not only as a counting signal but also to supply at least a part of the downstream-disposed electronic processing system with electrical energy until that counting pulse has been processed with the correct sign and the freshly produced count value has been stored in a non-volatile memory. The latter can then be queried upon restoration of the energy supply. That therefore ensures that the number of revolutions through which the drive shaft passes during a failure of the energy supply can be satisfactorily counted.

In the case of singleturns in comparison the current angular position of the drive shaft is afforded by the relative angular position of at least two bodies which are movable relative to each other and which can be for example a disk encoded in a plurality of tracks with associated optical scanning sensors; a multi-field Hall probe with one or more permanent magnets rotating relative thereto; or two magnetic flux conductor bodies which rotate relative to a stationary coil arrangement. A current or voltage supply is only required for reading out the instantaneous angular position of the two mutually movable bodies but not for the purely mechanical mapping function performed thereby; that therefore continues to operate even when the drive shaft rotates in the current-less and voltage-less conditions so that upon restoration of the energy supply the singleturn can immediately detect the current angular position (within the full angle of 360°) and convert it into a correct measurement signal. Such a singleturn is thus in itself "absolute".

The term "exciter arrangement" is used to denote the part of a revolution counter or singleturn which, in its relative movement with respect to the sensor, which represents the rotary movement of the drive shaft, causes the sensor to deliver a measurement signal. In the case of a magnetically operating arrangement the exciter arrangement is formed for example by a permanent magnet, the magnetic field of which represents the physical parameter exciting the stationary sensor. In the case of optical singleturns the "exciter arrangement" is the encoded disk, the varying light transparency of which alters the brightness of the light impinging on the sensor arrangement.

The term sensor arrangement is used to denote the stationary part of the revolution counter and/or singleturn, which in the case of a magnetic exciter arrangement involves for example a multi-quadrant Hall probe and/or a Wiegand or pulse wire with induction coil or in the case of a optically encoded disk it involves one or more phototransistors or the like.

The term sensor unit is used to denote a unit which forms a part of a rotary encoder and includes a one-stage transmission with an input gear which is arranged concentrically to the drive shaft and is non-rotatably connected thereto. Then, connected to a second gear of the single-stage transmission, the second gear being in engagement with the drive shaft, are one or two exciter arrangements of the above-described kind, cooperating with one or two sensor arrangements also belonging to the sensor unit, in accordance with the foregoing definition. Such a sensor unit is completed by an electronic circuit which receives the electrical signals coming from the sensor arrangement or arrangements and therefrom calculates and stores the angle values which are of interest.

Such a sensor arrangement is known from DE 195 06 938 A1. The rotary encoder described there includes two such sensor units which respectively form a singleturn. So that clear information for a rotary angle of the drive shaft, which goes beyond 360°, is possible, both the input gear and also the two second gears of the two sensor units must have different numbers of teeth. Then, the angular position of the drive shaft can be determined by a kind of vernier method for a rotary angle range which admittedly goes beyond 360° but is limited to a few revolutions. That known arrangement is intended in particular for detecting the steering angle of motor vehicles, at which that limited nature of the maximum angular range that can be detected is not a problem.

Disadvantages with that known arrangement are inter alia the structural size thereof and the large number of precise components used.

In comparison the object of the present invention is to develop a sensor unit of the kind set forth in the classifying portion of claim 1 in such a way that with a level of technical complication and expenditure which is reduced in comparison with the above-depicted state of the art, it makes it possible in a manner which is absolute in the foregoing sense on the one hand to resolve the rotary angle of the drive shaft into individual segments of respectively less than 360° and in addition to count a practically unlimited number of full revolutions of the drive shaft while detecting the direction of rotation and to store the respective count value reached. In addition the invention seeks to provide a sensor unit according to the invention which involves the smallest possible amount of space.

To attain that object the invention provides the features recited in claim 1.

In that respect the term "segment counter" is used to denote a device which when passing through a plurality of angular positions of the drive shaft within a full revolution of the associated second gear produces a counting signal. Depending on the respective configuration of the exciter and/or sensor arrangement a counted "segment" can extend over either a semicircle, a quarter of a circle or a third of a circle and so forth, that is to say therefore 360°/m (m=2, 3, 4, ... ). In that case m does not necessarily have to be an integer.

In accordance with the invention that segment counter is in the form of an absolute segment counter, that is to say for example it is designed as was described hereinbefore for a revolution counter. Details of such a revolution counter can be found in particular in DE 102 59 223 B3 and PCT/DE2008/001305, the technical contents of which are also incorporated here.

Thus the magnetic segment counter exciter arrangement is formed by one or more permanent magnets which are non-rotatably mounted on the second gear and which in particular are so arranged that their respective magnetization direction, that is to say the connecting line between the respective North pole and the associated South pole extends approximately perpendicularly to the geometrical axis of rotation of the second gear, referred herein for brevity as the "sensor axis". The stationary segment counter sensor arrangement is formed by a pulse or Wiegand wire, past which alternating magnetic poles must move so that each of those passing movements can be counted. Consequently, when there is only one such permanent magnet, segments each of 180° are counted (n=2). The next higher possible numbers of permanent magnets are three (n=6) and five (n=10) etc. (that is to say always odd numbers) so that in those cases six or ten segments with a respective angle coverage of 60° and 36° respectively and so forth can be counted.

Such "fine resolution" of the full circle may initially not appear to be very high, but it is to be noted that this involves the full circle through which the second gear passes. If the transmission of the sensor unit is formed with a transmission ratio of u>1 so that the second gear rotates u times per full revolution of the input gear, the number of countable segments of a full revolution of the drive shaft is increased by the factor u so that, with a transmission ratio of 1:36 and five permanent magnets, that gives a fine resolution for the drive shaft full circle of 10.

According to the invention the electronic circuit of the sensor unit is such that, in the event of failure of the external energy source, by means of the electrical energy which is still available and which is contained in the electrical pulses of the segment counter sensor arrangement, it can at least count those pulses with the correct sign and store the respectively achieved count value in a non-volatile memory. That is possible even if the rotary movement of the drive shaft, from the kinetic energy of which the electrical energy required for operation of the electronic circuit is obtained, occurs at any slow speed.

When the external energy supply is then available again, the instantaneous angular position of the drive shaft can be calculated from the attained count value, having regard to the transmission ratios and the angular magnitude of the counted segments. When using electronic components, in particular integrated circuits with an extremely low power consumption, it is conceivable for the calculating operations also to be carried out by means of the electrical energy obtained from the counting pulses, so that this provides a sensor unit which is completely independent of an external energy supply (including a battery) and which covers its entire but slight energy requirement, from the kinetic energy of the rotating drive shaft.

In a particularly preferred fashion the sensor unit is in the form of an absolute multiturn in that in addition to the singleturn function of the segment counter its electronic circuit can continuously add the electrical pulses of the segment counter sensor arrangement over any number of revolutions and depending on the respective direction of rotation to the existing count value stored in the electronic circuit or can subtract them therefrom and can then store the fresh count value. Because of the above-discussed fine resolution and rotary speed transmission, very high count values are generally afforded for a plurality of full revolutions of the drive shaft, which occur in the same direction. That however does not signify any disadvantage because in accordance with the invention an electronic counter and a non-volatile electronic memory are used, the counting and storage capacity of which can be increased without substantial complication and expenditure. There is therefore no structural limitation in respect of the maximum count value and it is possible to implement simple adaptation to any desired situation of use, which does not lead to any increased costs worth mentioning and which has practically no influence on the structural size. With the transmission factor therefore the resolution and accuracy which can be achieve in respect of the angular positioning of the drive shaft are increased depending on the respective magnitude of the play in the transmission, in a particularly advantageous fashion.

For the situation where the fine resolution which can be achieved by means of the segment counter is not sufficient, it is preferably provided that the sensor unit in addition to the segment counter has an absolute singleturn, the singleturn exciter arrangement of which is mounted on the same second gear as that of the segment counter. In addition there is a stationary singleturn sensor arrangement which by virtue of the rotary movement of the singleturn exciter arrangement generates electrical signals which are used by the electronic circuit for calculating the instantaneous angular position of the drive shaft together with the count values of the segment counter, wherein once again the transmission ratio of the single-stage transmission is taken into account.

It is preferable if the singleturn exciter arrangement involves at least one permanent magnet, the direction of magnetization of which is perpendicular to the sensor axis of the sensor unit. The singleturn sensor arrangement can then be formed by a component, for example a multi-field Hall probe, which is axially directly opposite the exciter arrangement on that sensor axis and which is distinguished by an extremely small size, low cost and high reliability and which in that respect readily provides for fine resolution of the order of magnitude of 16 bits.

An additional advantage is that fine resolution can be improved in relation to the rotary speed transmission factor of the transmission. It is therefore possible to use comparatively simple and thus inexpensive components for the singleturn sensor arrangement, for example a simple 4-quadrant Hall probe which then at the same time performs the function of the additional sensor element of the segment counter, thereby saving on a component.

The combination according to the invention of a singleturn with a segment counter provides for resolving the problem occurring when using a step-up transmission, of the indefinite nature of the segment subjected to fine resolution by the singleturn (semicircle, third of a circle, quarter of a circle and so forth), because the electronic counting and evaluation system can calculate by means of the segment count value ascertained by the segment counter starting from a known starting point, which segment is precisely subjected to fine resolution by the singleturn.

So that the singleturn also achieves a high level of accuracy with a high resolution capability, it is preferable to provide for play-free engagement of the second gear into the input gear. In that respect it is preferable for the second gear to be divided into two mutually coaxially arranged gear portions with the same number of teeth. With an even number of teeth (which is then also the case with the input gear) the two gear portions are arranged axially immovably at an axial spacing relative to each other. Disposed in the intermediate space formed in that way is a coil spring which biases the one of the two gear portions which is mounted freely rotatably on the sensor shaft relative to the other gear portion which is non-rotatably connected to the sensor shaft, in the direction of rotation. Admittedly, that coil spring must carry the moment of inertia of the exciter arrangement in the direction of rotation in opposite relationship to its biasing force, but that is possible without any problem because of the low mass thereof. If a helical tooth arrangement is adopted for the input gear and also for the two gear portions, they are both non-rotatably connected to the sensor shaft. The first of the two gear portions is also axially immovable while the other is displaceable axially relative to the first one and is urged away from same by a plate spring arranged between them so that the helical tooth configuration provides for bracing to the input gear, that ensures freedom from play.

If the singleturn and the segment counter have a common exciter arrangement, for example a permanent magnet, the direction of magnetization of which is perpendicularly to the sensor axis of the second gear, the two sensor arrangements (for example a 4-quadrant Hall probe of the singleturn and a Wiegand wire with wound-on induction coil for the segment counter) can be arranged either in two mutually parallel planes extending perpendicularly to the axis of rotation, or they can be located in a single plane, in which case then preferably all components of the two sensor arrangements are integrated in a single semiconductor chip and/or are combined together. That semiconductor chip can also include the electronic circuit and a µ-controller.

Preferably a sensor unit according to the invention which includes both a segment counter and also a separate singleturn has only one single magnetic exciter arrangement cooperating both with the sensor arrangement of the segment counter and also with that of the singleturn.

A rotary encoder according to the invention preferably has a sensor unit of the kind described hereinbefore. It is distinguished by a very small structural size. Preferably it includes a sleeve which mounted rotatably in its housing and which concentrically carries the input gear non-rotatably connected thereto. The drive shaft can then be inserted into that sleeve from the exterior, for a non-rotational connection. For hollow shaft arrangements in which the two ends of the drive shaft must be free because for example the one end is driven by a motor while the other drives some further unit or is occupied by a brake the sleeve can be open at both ends so that the drive shaft can be fitted therethrough so that on the side opposite the entry side of the housing it projects out of a further housing opening provided there.

In addition a rotary encoder according to the invention can also include more than one of the above-described sensor units. In that case the transmission has a plurality of second gears, the sensor axes of which do not coincide. Each of those sensor units can include both a segment counter and also a singleturn or one of them has the singleturn and the other a segment counter. The redundancy in the first-mentioned case can be required for example for safety and reliability reasons. The second case involves division of tasks between the two second sensor units. A particular advantage of this arrangement is that an optimum design configuration for the exciter sensor geometry can be respectively involved in both second sensor units. In both cases it is admittedly possible but not necessarily required for all second gears to have the same rotary speed transmission ratio, in relation to the input gear. To perform the function of a rotary encoder according to the invention it is however sufficient if it includes only one single sensor unit.

These and other advantageous configurations and developments of the angle measuring unit according to the invention are set forth in appendant claims.

Figure 2:
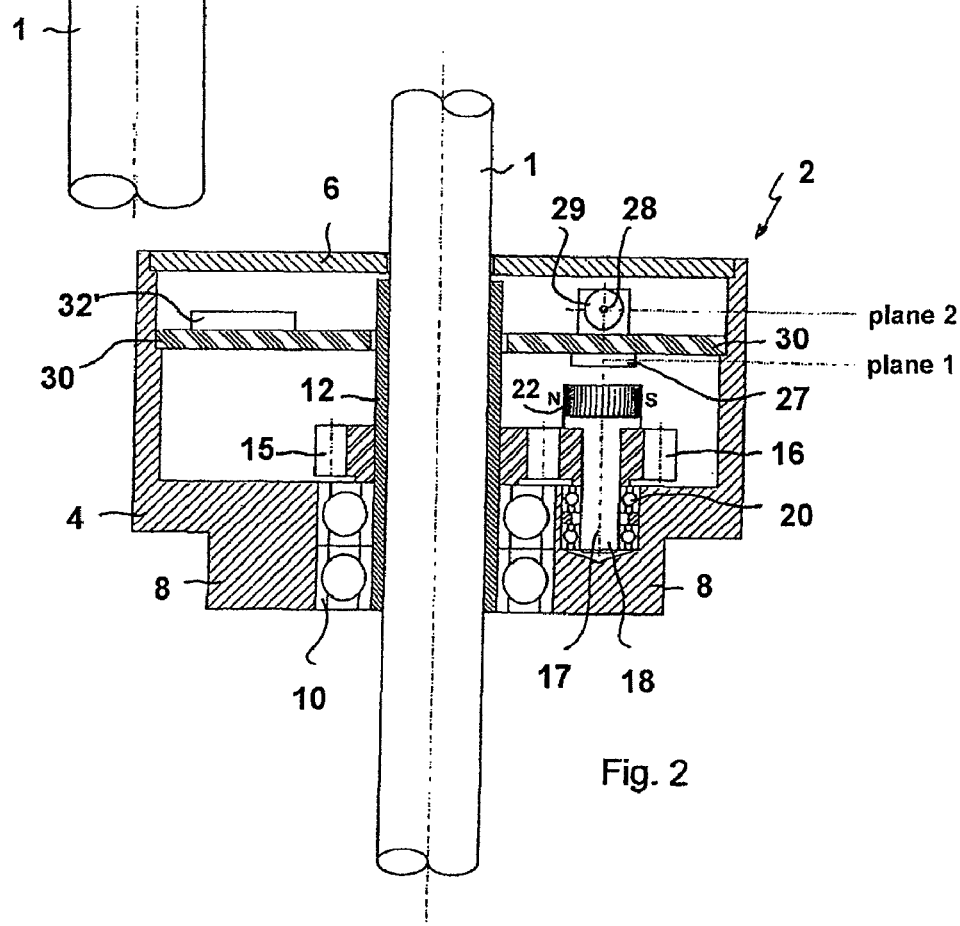
Figure 3:
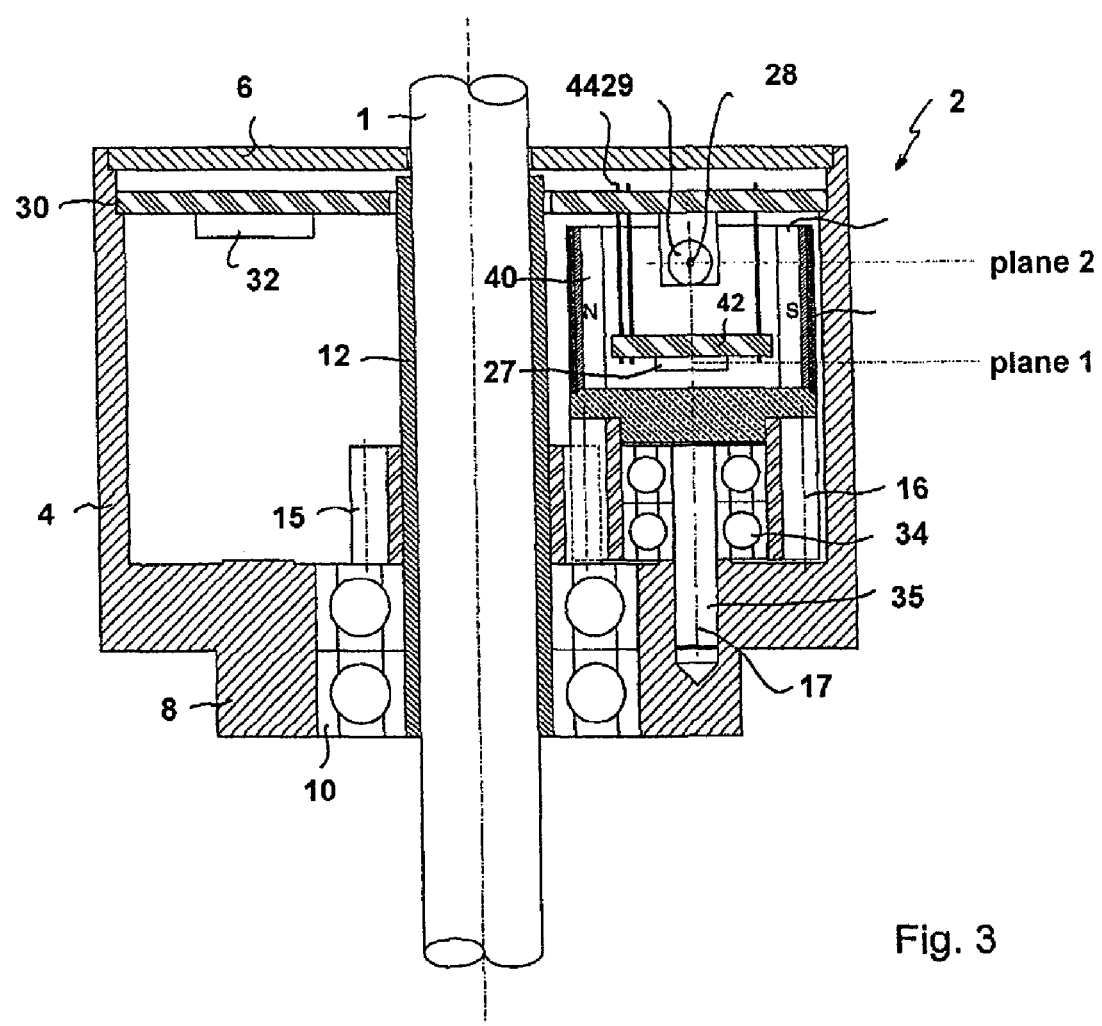
Figure 4:
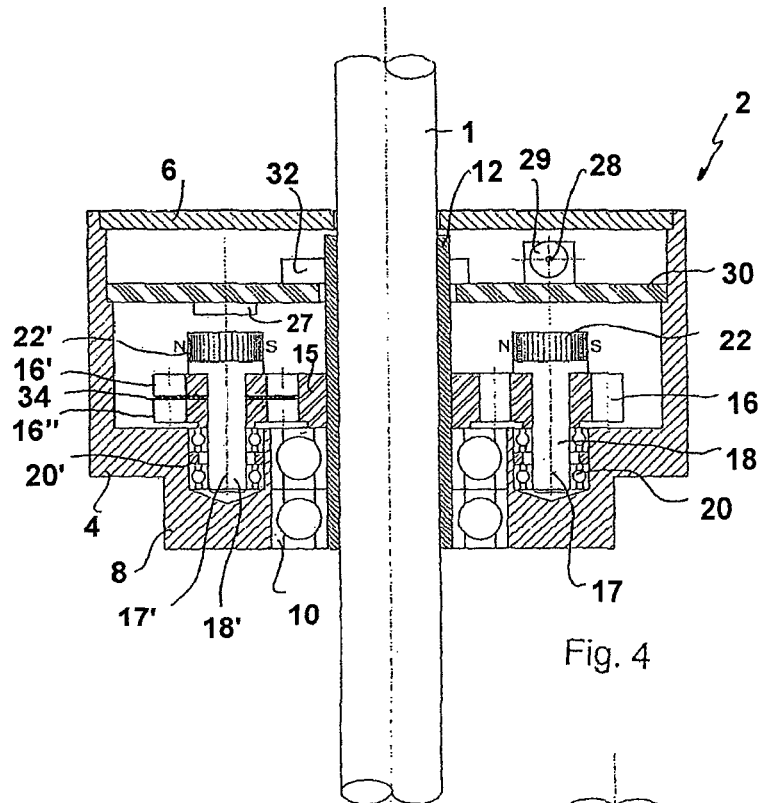
Figure 5:
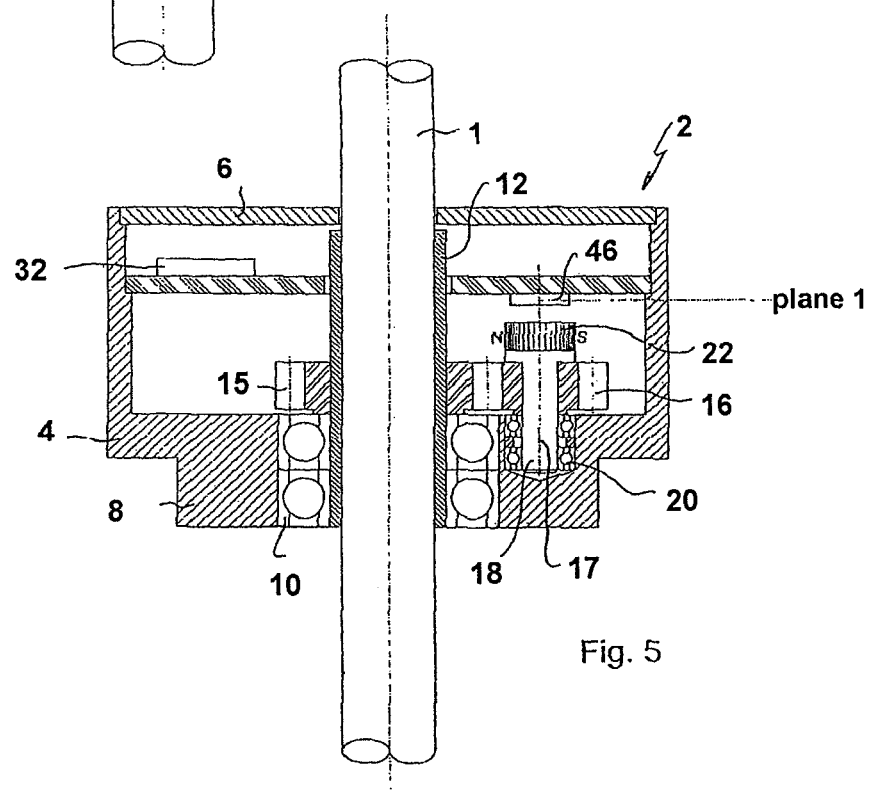

The invention is described hereinafter by means of embodiments by way of example with reference to the drawing in which:

FIG. 1 shows an axial section through a first embodiment of a rotary encoder according to the invention which is fitted onto a free end of a drive shaft and which is of an asymmetrical configuration and which is equipped with a sensor unit in the form of a segment counter, FIG. 2 shows an axial section through a further embodiment of a rotary encoder according to the invention which is of a symmetrical configuration and which is equipped with a sensor unit including both a segment counter and also a singleturn, the drive shaft extending completely through the housing of the rotary encoder, FIG. 3 shows an axial section through a third embodiment of a rotary encoder according to the invention in which both the transmission and also the sensor unit are of a different structure from the embodiment of FIG. 2, FIG. 4 shows an axial section through a fourth embodiment of a rotary encoder according to the invention with two sensor units of which one includes a singleturn with a divided second gear and the other includes a segment counter, and FIG. 5 shows an axial section through a fifth embodiment of a rotary encoder according to the invention, with a sensor unit which includes both a segment counter and also a singleturn and in which the two sensor arrangements are disposed in a single plane.

In the Figures parts which are the same as or which correspond to each other are denoted by the same references.

FIG. 1 shows a drive shaft 1, the revolutions of which are to be detected by means of a rotary encoder 2.

The rotary encoder 2 has a housing 4 which preferably comprises ferromagnetic material for screening in relation to external magnetic fields and which is substantially in the shape of a hollow cylinder whose end which is the upper end in the Figures is closed by a cover 6 preferably comprising electrically conducting material. At its opposite end the housing 4 has a projecting flange 8 with a bore therethrough for receiving a bearing 10, by means of which the housing 4 is mounted to the drive shaft 1. An abutment (not shown) prevents it from rotating with the drive shaft 1.

In the embodiment shown in FIG. 1 the upper end 11 of the shaft 1 is introduced into a hollow shaft 12 closed at its upper end by an end portion. That end portion has a bore, through which extends a screw 13 which is screwed into the female screwthread of a blind hole 14 centrally provided in the end 11 of the shaft 1 in order to connect the hollow shaft 12 non-rotatably to the shaft 1.

In addition the rotary encoder 2 includes a mechanical single-stage transmission which is disposed in the interior of its housing 4 and which in the present case comprises two gears 15, 16 on which the larger input gear 15 is arranged concentrically to and is non-rotatably connected to the hollow shaft 12.

The smaller second gear 16 which is approximately half the diameter of the input gear 15 is non-rotatably connected to a sensor shaft 18 which extends parallel to the drive shaft 1 and which is mounted in the housing 4 rotatably by means of bearings 20 so that the second gear 16 can rotate about its geometrical axis of rotation 17.

At its free upper end the sensor shaft 18 carries a disk-shaped diametrally magnetized permanent magnet 22 whose North and South pole axis extends perpendicularly to the axis of rotation 17 of the sensor shaft 18 so that the two poles involve equal spacings from the axis of rotation 17. The permanent magnet 22 is concentrically surrounded by two ferromagnetic flux conduction bodies 25, 25 which are in the form of metal sheet and which rotate jointly therewith and which respectively involve the shape of a hollow-cylinder segment of small axial height, extending over an angle of about 90° of the full circle which is concentric with respect to the axis of rotation 17. Those bodies 25, 25 deflect the magnetic field lines which initially issue substantially horizontally out of the permanent magnet 22 upwardly so that the field lines which close pass on the one hand through a Wiegand wire 28 which extends perpendicularly to the plane of the drawing in FIG. 1 and onto which an induction coil 29 is wound, and on the other hand an additional sensor element 33 whose output signal, in accordance with DE 102 59 224 B3, jointly with the signals furnished by the induction coil 29, permits counting of the segments, with the correct sign.

The flux conduction bodies 25, 25 make it possible to keep small the radial spacings between the poles of the permanent magnet 22 and the housing 4 consisting of ferromagnetic material without a magnetic short-circuit occurring. If the housing 4 comprises electrically conducting material the flux conduction bodies 25, 25 avoid the production of eddy currents even when the permanent magnet 22 is rotating at high speed.

A board 30 which extends horizontally through the housing 4 and which comprises plastic material carries the Wiegand wire 28 with the induction coil 29 wound thereon. The board 30 can have at one or both sides conduction tracks which serve for the power supply to the sensor components and to connect the signal terminals of the induction coil 29 to a symbolically indicated electronic circuit 32 which is preferably in the form of an integrated circuit or chip, and the additional sensor element 33, which passes the count values produced by the rotary encoder 2 to a user by way of connecting lines (not shown) which are passed out of the housing 4. The additional sensor element 33 is here a Hall probe but it can also be a field plate or a similar magnetic field-sensitive element.

The second gear 16, the permanent magnet 22 non-rotatably connected thereto, the flux conduction bodies 25, 25, the Wiegand wire 28, the induction coil 29, the electronic circuit 32 and the additional sensor element 33 here form a sensor unit which is in the form of an autonomous segment counter.

As the transmission has a transmission ratio of 1:2 and therefore the second gear 16 rotates twice as often as the input gear 15 the autonomous segment counter produces four counting pulses for each full revolution of the shaft 1. The electronic circuit 32 includes a corresponding counter, the counting capacity of which is subject to as good as no limitation in respect of size or cost so that for each situation of use it is possible to select it to be so large that there is certain not to be any overflow of the multi-turn counter.

An absolute segment counter which operates with a rotating permanent magnet, a Wiegand wire and an induction coil is to be found for example in DE 102 59 223 B3 to which attention is directed in respect of the details involved. It will be noted however that it is to be expressly emphasized that other embodiments of absolute segment counters can also be used in conjunction with the rotary encoder 2 according to the invention. The only essential aspect is that the segment counter comprises small inexpensive components and is in a position to derive the electrical energy required for producing counting pulses and for detection and intermediate storage therefrom from the rotary movement of the drive shaft 1 so that it can satisfactorily count even when there is no power supply from a mains network, a battery or the like.

It is admittedly possible in principle for the transmission ratio of the transmission to be selected at precisely 1:2, 1:3, 1:4 and so forth. In order however to keep the wear of the gears 15, 16 as low as possible, it is preferable to adopt for the number of teeth of the two gears 15, 16, two prime numbers whose product is as large as possible so that it is only after a number of revolutions corresponding to that product that the same teeth of the gears 15, 16 engage into each other again. In principle that does not change anything in regard to the foregoing description in respect of the mode of operation of the segment counter. It only requires a somewhat higher level of computing effort which however can be readily afforded by the electronic circuit 32 at least in the periods in which it is connected to an external power supply or a power supply from a battery.

The rotary encoder shown in FIG. 2 differs from that shown in FIG. 1 on three points:

a) the hollow shaft 12 which non-rotatably carries the input gear 15 is open throughout so that the drive shaft 1 can be pushed therethrough. The cover 6 has a corresponding through opening. That arrangement has the advantage that such a hollow shaft rotary encoder can be used even when the end of the drive shaft 1, which is opposite the end driven by a motor, has to be connected to a further unit which for example is a brake or a machine to be driven or the like.

b) the ferromagnetic flux conduction bodies 25, 25 are omitted, which in the variant shown in FIG. 1 serve for better guidance of the magnetic field lines from the permanent magnet 22. Those bodies 25, 25 can however also be used in the embodiment of FIG. 2. Conversely it is in principle also possible to omit them in the embodiment of FIG. 1. In order then to avoid the risks of a magnetic short-circuit or eddy current production, the housing 4 should then comprise a non-ferromagnetic material or an electrically non-conducting material. Such a rotary encoder 2 is suitable for conditions of use in which no disturbance by external magnetic fields can occur, for example if there is in any case magnetic field screening enclosing the rotary encoder.

c) The most essential difference however is that the sensor unit shown here, in addition to the segment counter, for improved fine resolution of the 360° full revolution of the sensor shaft 18, includes a singleturn whose singleturn exciter arrangement is also formed by the permanent magnet 22, that is to say it is identical to that of the segment counter, and which further has as a singleturn sensor arrangement a Hall probe 27 carried by the board 30 on its underside and preferably including four quadrants, as well as an enlarged electronic processing system 32' which is adapted not only for counting detection of the counting pulses supplied by the segment counter sensor arrangement but also for evaluation of the signals coming from the Hall probe 27 and for calculating the instantaneous angular position of the drive shaft 1. It is possible to dispense with the additional sensor element 33 here.

The singleturn formed by the permanent magnet 22 and the Hall probe 27 is also known from the state of the art and therefore does not need to be further described. Because of the transmission ratio of the transmission, as already mentioned hereinbefore, the singleturn exciter arrangement rotates through 360° when the drive shaft 1 rotates through 180°, that is to say, for the second half-revolution of the drive shaft 1, the singleturn produces the same output signals as for the first one. A combination of the signals supplied by it with the count values of the segment counter however makes it possible to exactly determine at any time which half of the full circle amounting to 360° is just being covered by the shaft 1.

A particular advantage of this arrangement is that the resolution capability is increased in accordance with the transmission ratio of the transmission.

The embodiment of a rotary encoder according to the invention as shown in FIG. 3 also provides that the drive shaft 1 extends completely through the housing 4 so that its drive-output end can be coupled to a further unit.

A first difference in relation to the preceding embodiments is that here the two gears 15, 16 are of the same diameter and therefore the second gear 16 rotates at the same speed as the input gear 15 and thus also the shaft 1.

In addition the gear 16 is mounted freely rotatably by means of a bearing 34 on a spindle 35 fixedly connected to the housing 4. On its end which is upward in FIG. 3 the second gear 16 carries a permanent magnet arrangement formed by two permanent magnets 39, 40 in the form of vertically standing hollow-cylinder segments, each of which extends as far as an angle of a maximum of 180° but preferably 90° of the full circle concentric with respect to the spindle 35, and which on its outside are surrounded by a complete hollow cylinder 41 of ferromagnetic material which forms a return body and which permits a very small spacing between the permanent magnets 39, 40 and the ferromagnetic housing 4 without the risk of a magnetic short-circuit. The polarities of the two permanent magnets 39, 40 are mutually opposite, that is to say the North pole of the one permanent magnet 39 is in the interior of the enclosed hollow-cylindrical space while the North pole of the permanent magnet 40 is on the outside.

This arrangement affords a very uniform magnetic field in the interior of the hollow-cylindrical space formed in that way at least in the region in which the Hall probe 27 is disposed so that the Hall probe 27 can operate as a singleturn with a high resolution capability. To bring the Hall probe 27 into that region it is mounted on its own board 42 which is fixed to the board 30 by way of downwardly projecting holders 44. The Wiegand wire 28 and the induction coil 29 surrounding it are also mounted on the underside of the board 30 so that they project into interior of the hollow-cylindrical space filled by the magnetic field. It is also possible here to dispense with the additional sensor element 33.

This embodiment therefore also involves a sensor unit which includes both a segment counter and also a singleturn with high fine resolution.

FIG. 4 shows a rotary encoder 2 which differs from the above-described encoders in that there are two sensor units with two second gears 16 and 16', each of which is in engagement with the input gear 15 and is fixedly connected to a shaft 18 and 18' respectively which is mounted rotatably in the flange 8 by means of bearings 20 and 20' respectively, wherein the second gear of the singleturn shown on the left-hand side in FIG. 4 is subdivided into two gear portions 16', 16" with a plate spring 34 inserted therebetween to achieve freedom from play in the above-described manner.

Both the second gear 16 and also the gear portion 16' respectively carry a permanent magnet 22 and 22' of which the permanent magnet 22 of the sensor unit shown at the right in FIG. 4 serves as an exciter arrangement for a segment counter with Wiegand wire 28 and induction coil 19 and the permanent magnet 22' of the sensor unit shown on the left-hand side serves as an exciter arrangement for a singleturn with a Hall probe 27. In the illustrated embodiment the second gears 16 and 16', 16" have the same number of teeth. Such a configuration in respect of the rotary encoder permits separate optimization of the respective sensor unit geometry. In that case both the exciter arrangement and also the sensor arrangement can be of different structures. In this case also the Hall probe 27 of the singleturn performs the task of the additional sensor element 33 of the segment counter.

Two or more identical sensor units of which for example each includes both a segment counter and also a singleturn are advantageously used whenever redundancy is required for safety and reliability reasons. Because of the shape of the housing 4, being radially symmetrical with respect to the drive shaft 1, the structural size is not increased in that situation.

If desired the two second gears 16, 16' can also have different numbers of teeth.

The rotary encoder 2 shown in FIG. 5 corresponds to the rotary encoder of FIG. 2 with the exception that here in accordance with the invention there is provided a sensor arrangement 46 which in the form of an integrated circuit chip and in respect of which two different embodiments are possible:

a) both a Wiegand wire 28 with induction coil (segment counter) and also a 4-quadrant Hall probe (singleturn) or other components performing a corresponding function as well as the electronic circuit and a µ-controller can be integrated in the circuit chip;

b) the integrated circuit chip only includes one Wiegand wire with induction coil, the additional sensor element as the Hall probe and the electronic circuit and a p-controller. If then instead of a permanent magnet 22 with two poles a multi-pole permanent magnet is used so that for example six counting pulses are produced per revolution of the second gear 16, then with a transmission ratio of 1:12 for each full revolution of the drive shaft 1 the arrangement produces seventy two counting pulses so that it is not only possible to calculate the corresponding full revolutions from the segment count value, but angular "fine resolution" in 50 steps is also possible.

As an alternative to the illustrated embodiments it is also possible to use a transmission with more than one stage.

For reasons of a suitably predetermined structural shape it may be advantageous, instead of the cylindrical gears shown, to use bevel gears so that at least one of the sensor axes is perpendicular to the drive shaft.

The invention claimed is:

1. A sensor unit for a rotary encoder which serves for detecting the rotary movements of a drive shaft (1) in both directions and which has a single-stage transmission with an input gear (15) which is arranged concentrically with respect to and is non-rotatably connected to the drive shaft (1), characterized in that the sensor unit (3) includes an absolute segment counter which serves for counting the angle segments through which the drive shaft (1) passes within each 360° rotation and has the following components:

a magnetic segment counter exciter arrangement non-rotatably mounted on the second gear (16) of the transmission, that engages into the input gear (15), a stationary segment counter sensor arrangement which includes a Wiegand or pulse wire (28) with wound-on induction coil (29) and an additional sensor element (33) and which delivers electrical pulses whenever the magnetic segment counter exciter arrangement passes through predetermined angular positions, and an electronic circuit (32) which counts said electrical pulses, stores the respectively acquired count value and calculates therefrom the instantaneous angular position of the drive shaft (1) having regard to the transmission ratio of the transmission.

2. A sensor unit as set forth in claim 1 characterized in that it is in the form of an absolute multiturn in that the electronic circuit (32) continuously counts the electrical pulses of the segment counter sensor arrangement over any number of revolutions of the drive shaft (1) and in so doing depending on the respective direction of rotation adds them to or subtracts them from the existing count value stored in the electronic circuit (32) and then stores them again.

3. A sensor unit as set forth in claim 1 characterized in that in addition to the absolute segment counter it has an absolute singleturn which for the fine resolution of angle segments through which the drive shaft (1) passes has a singleturn exciter arrangement mounted non-rotatably on the second gear (16) and a stationary singleturn sensor arrangement, and that the electronic circuit (32) in calculating the instantaneous angular position of the drive shaft (1) uses both the stored count value of the segment counter and also angle measurement signals supplied by the singleturn sensor arrangement and having regard to the transmission ratio.

4. A sensor unit as set forth in claim 3 characterized in that the additional fine-resolution singleturn also serves as an additional sensor element.

5. A sensor unit as set forth in claim 3 characterized in that the second gear (16) is adapted for play-free engagement into the input gear (15).

6. A sensor unit as set forth in claim 3 characterized in that the singleturn sensor arrangement and the segment counter sensor arrangement are arranged in a first and a second plane respectively, wherein the two planes extend in mutually parallel relationship and perpendicularly to the geometrical axis of rotation (17) of the second gear (16).

7. A sensor unit as set forth in claim 3 characterized in that the singleturn sensor arrangement and the segment counter sensor arrangement are disposed in one and the same plane.

8. A sensor unit as set forth in claim 3 characterized in that both the singleturn exciter arrangement and also the segment counter exciter arrangement includes at least one permanent magnet (22), the direction of magnetization of which extends perpendicularly to the geometrical axis of rotation (17) of the second gear (16).

9. A sensor unit as set forth in claim 8 characterized in that the at least one permanent magnet (22) is arranged concentrically to the geometrical axis of rotation (17) of the second gear (16).

10. A sensor unit as set forth in claim 8 characterized in that two ferromagnetic flux conduction portions (25) are associated with the at least one permanent magnet (22).

11. A sensor unit as set forth in claim 3 characterized in that the segment counter exciter arrangement is identical to the singleturn exciter arrangement.

12. A sensor unit as set forth in claim 3 characterized in that the stationary singleturn sensor arrangement includes a 4-quadrant Hall probe (27).

13. A rotary encoder characterized in that it includes at least one sensor unit as set forth in claim 1.

14. A rotary encoder as set forth in claim 13 characterized in that at least one of the second gears (16, 16') has the same or a smaller number of teeth than the input gear (15).

15. A rotary encoder as set forth in claim 13 characterized in that the input gear (15) is mounted concentrically and non-rotatably on a hollow shaft (12) into which the drive shaft (1) can be introduced for a non-rotational connection there between.

16. A rotary encoder as set forth in claim 13 characterized in that the geometrical axis of rotation (17, 17') of at least one second gear (16, 16') extends parallel to the hollow shaft (12).

17. A rotary encoder as set forth in claim 13 characterized in that the geometrical axis of rotation (17, 17') of the at least one second gear (16, 16') extends at an angle of preferably 90° to the hollow shaft (12).

18. A rotary encoder as set forth in claim 13 characterized in that the numbers of teeth of the input gear (15) and at least one second gear (16, 16') are prime numbers.

19. A rotary encoder as set forth in claim 13 characterized in that the transmission ratio is in accordance with the law $2^n$, wherein n is an integer $\geq 0$.

20. A rotary encoder characterized in that it includes two sensor units of which a first forms only one segment counter as set forth in claim 1, insofar as same concern a segment counter, while the second forms an absolute singleturn which for the fine resolution of angle segments through which the drive shaft (1) passes has a singleturn exciter arrangement non-rotatably mounted on a further second gear (16') meshing with the input gear and a stationary singleturn sensor arrangement, and that in calculating the instantaneous angular position of the drive shaft (1) the electronic circuit (32) uses both the stored count value of the first sensor unit and also angle measurement signals supplied by the second sensor unit and having regard to the transmission ratio.

* * * * *